United States Patent
Herrera et al.

(10) Patent No.: US 9,091,782 B2
(45) Date of Patent: Jul. 28, 2015

(54) MODULAR RESISTIVITY LOGGING TOOL SYSTEMS AND METHODS EMPLOYING AN ADAPTER IN AN ISOLATION JOINT CONFIGURATION

(71) Applicant: Halliburton Energy Services, Inc., Houston, TX (US)

(72) Inventors: Adan Hernandez Herrera, Baytown, TX (US); Adarsh Arun Ainapur, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 273 days.

(21) Appl. No.: 13/713,608

(22) Filed: Dec. 13, 2012

(65) Prior Publication Data

US 2014/0167767 A1  Jun. 19, 2014

(51) Int. Cl.
*G01V 3/10* (2006.01)
*G01V 3/18* (2006.01)
*G01V 3/20* (2006.01)

(52) U.S. Cl.
CPC ........................................ *G01V 3/20* (2013.01)

(58) Field of Classification Search
CPC ............. G01V 3/28; G01V 3/20; G01V 3/24; G01V 3/30; G01V 3/22; G01V 11/002; G01V 11/00; G01V 3/26; G01V 3/32; G01V 3/38; G01V 3/18; G01V 11/005; G01V 3/34; G01R 27/20; G01R 33/3621
See application file for complete search history.

(56) References Cited

U.S. PATENT DOCUMENTS

| 4,278,942 A | 7/1981 | Bonnet et al. |
| 4,286,217 A | 8/1981 | Planche et al. |

(Continued)

FOREIGN PATENT DOCUMENTS

| WO | 2010/121346 | 10/2010 |
| WO | 2014/093103 | 6/2014 |

OTHER PUBLICATIONS

PCT International Search Report and Written Opinion, Mar. 20, 2014, Appl No. PCT/US2013/073165, "Modular Resistivity Logging Tool Systems and Methods," Filed Dec. 4, 2013, 15 pgs.

(Continued)

*Primary Examiner* — Vinh Nguyen
(74) *Attorney, Agent, or Firm* — Krueger Iselin LLP; Bejamin Fite

(57) ABSTRACT

Resistivity logging tool module systems and methods enable efficient logging string assemblies and logging operations. In some of the disclosed embodiments, a resistivity logging tool module includes a mandrel with a connector section at each end and a ring support section between the connector sections. The resistivity logging tool module also includes a composite layer disposed around the ring support section. A set of ring electrodes is positioned along the ring support section around the composite layer, wherein the composite layer electrically isolates the ring electrodes from the ring support section. One of the modules of the multi-module resistivity logging tool includes an adaptor in an isolation joint configuration with one of its connector sections. A related assembly method includes obtaining a mandrel with a connector section at each end and a ring support section between the connector sections. The method also includes disposing a composite layer around the ring support section. The method also includes moving a set of ring electrodes to a position along the ring support section, wherein the composite layer electrically isolates the ring electrodes from the ring support section. One of the modules of the multi-module resistivity logging tool includes an adaptor in an isolation joint configuration with one of its connector sections.

20 Claims, 8 Drawing Sheets

(56) References Cited

U.S. PATENT DOCUMENTS

| | | | |
|---|---|---|---|
| 4,356,629 | A | 11/1982 | Jeter et al. |
| 4,570,123 | A | 2/1986 | Grosso |
| 4,738,812 | A | 4/1988 | Raynal |
| 4,965,522 | A * | 10/1990 | Hazen et al. ............... 324/339 |
| 5,130,706 | A | 7/1992 | Van Steenwyk |
| 5,159,978 | A | 11/1992 | Tomek et al. |
| 5,200,705 | A | 4/1993 | Clark et al. |
| 5,939,885 | A | 8/1999 | McClure et al. |
| 6,114,972 | A * | 9/2000 | Smith ................... 340/854.6 |
| 6,116,337 | A | 9/2000 | Civarolo et al. |
| 6,359,438 | B1 | 3/2002 | Bittar |
| 6,373,254 | B1 | 4/2002 | Dion et al. |
| 7,046,112 | B2 | 5/2006 | Davies et al. |
| 7,071,837 | B2 | 7/2006 | Hudson et al. |
| 7,084,782 | B2 | 8/2006 | Davies et al. |
| 7,227,363 | B2 | 6/2007 | Gianzero et al. |
| 7,252,160 | B2 | 8/2007 | Dopf et al. |
| 7,363,160 | B2 | 4/2008 | Seleznev et al. |
| 7,394,257 | B2 | 7/2008 | Martinez et al. |
| 7,466,136 | B2 | 12/2008 | Chen et al. |
| 7,586,310 | B2 | 9/2009 | Chen et al. |
| 7,598,742 | B2 * | 10/2009 | Synder et al. ............... 324/339 |
| 7,982,463 | B2 * | 7/2011 | Snyder et al. ............... 324/339 |
| 7,982,464 | B2 | 7/2011 | Bittar et al. |
| 8,222,902 | B2 | 7/2012 | Bittar et al. |
| 8,299,796 | B2 | 10/2012 | San Martin et al. |
| 2007/0131412 | A1 | 6/2007 | Finci et al. |
| 2008/0156534 | A1 | 7/2008 | Clark et al. |
| 2011/0251794 | A1 | 10/2011 | Bittar et al. |

OTHER PUBLICATIONS

PCT International Preliminary Report on Patentability, Nov. 10, 2014, Appl No. PCT/US2013/073165, "Modular Resistivity Logging Tool Systems and Methods," Filed Dec. 4, 2013, 15 pgs.

SG Written Opinion, dated Dec. 15, 2014, Appl No. 201302462-5, "Isolation Joint with Electrodes to Measure Resistivity on Downhole Tool", filed Apr. 2, 2013, 15 pgs.

* cited by examiner

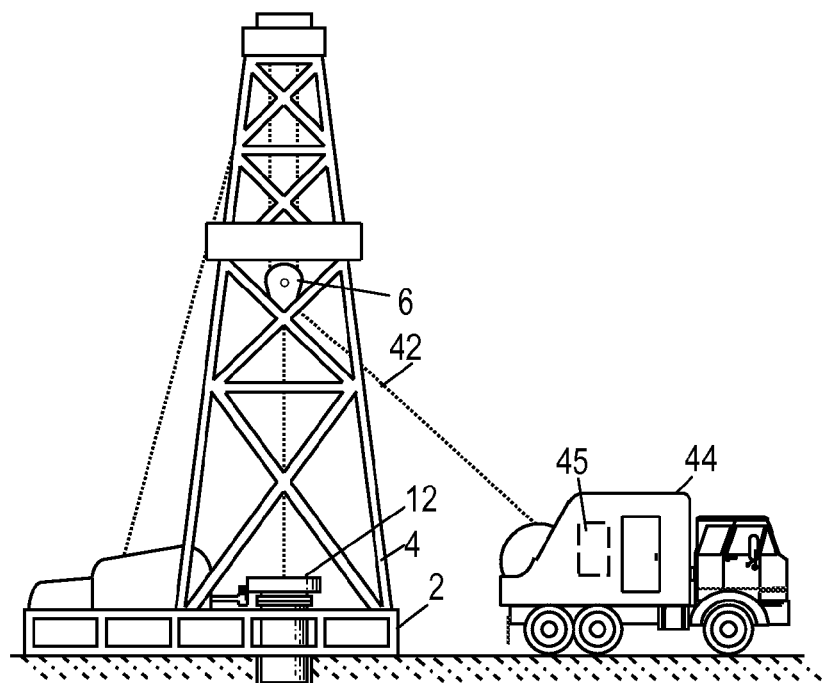
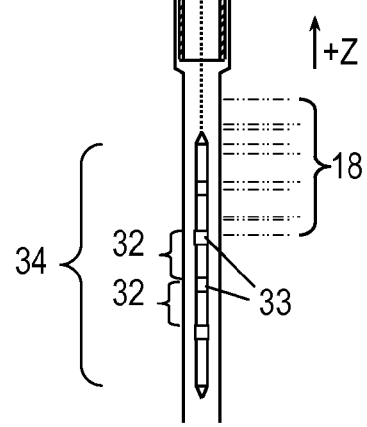
FIG. 2
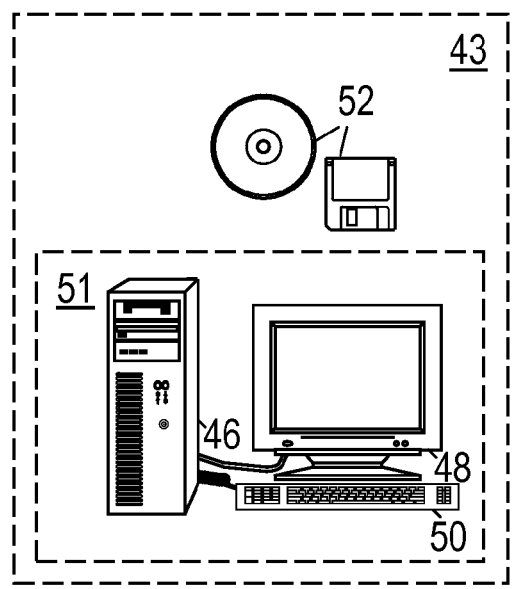
FIG. 3

MODULAR RESISTIVITY LOGGING TOOL SYSTEMS AND METHODS EMPLOYING AN ADAPTER IN AN ISOLATION JOINT CONFIGURATION

BACKGROUND

Modern oil field operations demand a great quantity of information relating to the parameters and conditions encountered downhole. Such information typically includes characteristics of the earth formations traversed by a borehole, and data relating to the size and configuration of the borehole itself. The collection of information relating to conditions downhole, commonly referred to as "logging," can be performed by several methods including wireline logging and "logging while drilling" (LWD).

One often-collected type of downhole information is the electrical resistivity of earth formations surrounding the borehole. Though such information can be used in a variety of ways, it is often taken as an indication of the type of fluid in the formation. For example, hydrocarbon-saturated porous formations have high resistivity, while water-saturated porous formations have low resistivity.

Electrode-based resistivity logging tools can be used to measure the formation resistivity. Such tools employ an arrangement of electrodes to generate electrical currents and/or potentials, to measure the resulting electrical potentials and/or currents, and optionally to shape the associated electrical fields to focus the measurements in some fashion. The formation resistivity is then derivable from the observed relationship between electrical current and potential.

The accuracy of electrode-based resistivity logging can be affected by various factors. For example, the electrodes may react chemically with fluids in the environment to form a surface layer having a measureable (and variable) electrical impedance, altering the generated and measured electrical currents and potentials from their ideal values and reducing measurement accuracy. In tool configurations having a conductive surface near the electrode (e.g., the tool body), the formation of surface layers can be particularly deleterious if the surface layers have different impedances. Focusing is achieved by keeping the nearby conductive surface at approximately the same potential as the measurement electrode, but the difference in surface layer impedances creates an undesired potential difference in the borehole fluid immediately outside the surface layers, causing undesired current flows that impair measurement accuracy and further impair spatial resolution of the tool due to focusing impairment. The smaller the mud resistance, the larger the effect of such differences in surface layer impedance.

Thus, the materials used in constructing an electrode-based resistivity logging tool are important considerations, not only due to their tendencies to form surface layers, but also due to their effects on tool assembly and strength. Poorly-chosen materials will limit the tool's strength and prevent it from being used in a drill string or even as part of a large wireline logging assembly.

BRIEF DESCRIPTION OF THE DRAWINGS

Accordingly, there are disclosed herein electrode-based resistivity logging tools having a central support mandrel isolated from a set of electrode rings by a layer of composite material, and manufacturing methods therefor. In the drawings:

FIG. 2 shows an illustrative wireline logging environment.

FIG. 3 shows an illustrative computer system for managing logging operations.

Figure 1:
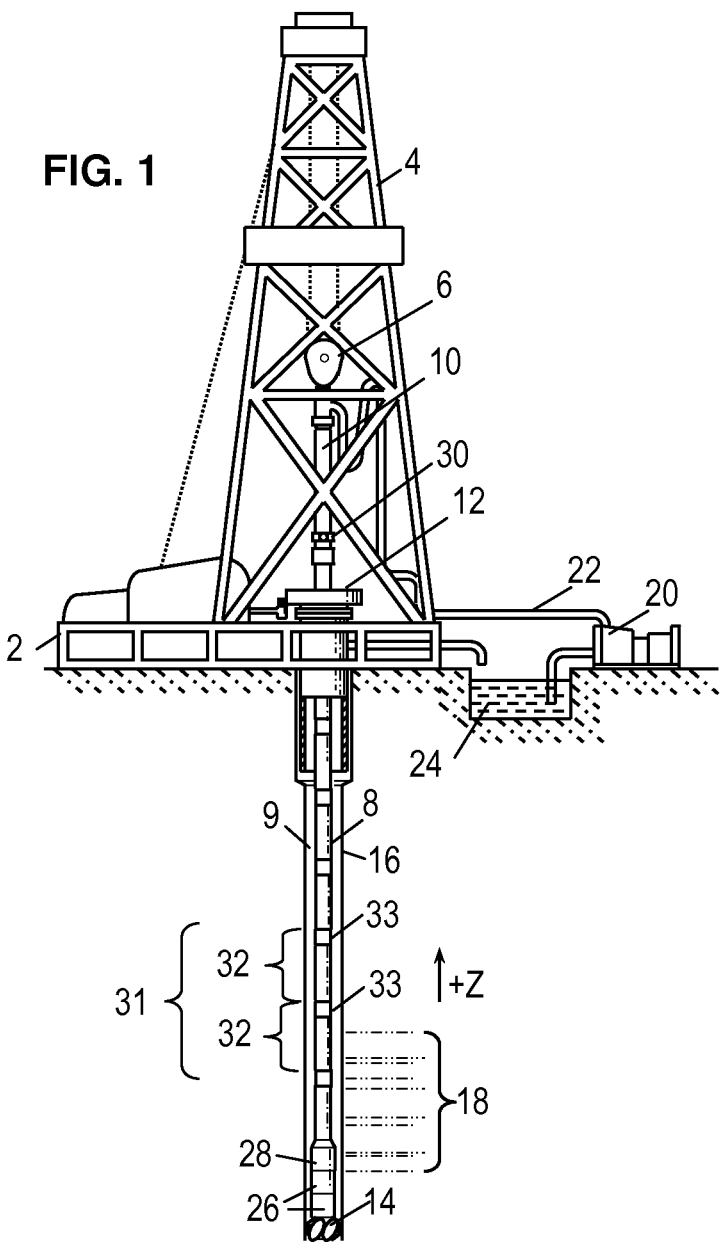
FIG. 1 shows an illustrative logging while drilling (LWD) environment.

It should be understood, however, that the specific embodiments given in the drawings and detailed description thereto do not limit the disclosure, but on the contrary, they provide the foundation for one of ordinary skill to discern the alternative forms, equivalents, and modifications that are encompassed with the given embodiments by the scope of the appended claims.

NOMENCLATURE

Certain terms are used throughout the following description and claims to refer to particular system components. This document does not intend to distinguish between components that differ in name but not function. The terms "including" and "comprising" are used in an open-ended fashion, and thus should be interpreted to mean "including, but not limited to . . . ".

The term "couple" or "couples" is intended to mean either an indirect or direct electrical, mechanical, or thermal connection. Thus, if a first device couples to a second device, that connection may be through a direct connection, or through an indirect connection via other devices and connections. Conversely, the term "connected" when unqualified should be interpreted to mean a direct connection. For an electrical connection, this term means that two elements are attached via an electrical path having essentially zero impedance.

DETAILED DESCRIPTION

The issues identified in the background are at least partly addressed by the various electrode-based resistivity logging tools and methods disclosed herein. At least some embodiments employ a resistivity logging tool module having a strong mandrel (e.g., a hollow steel body) with a connector at each end and a ring support section disposed between the connectors, wherein the ring support section is configured to receive a set of ring electrodes. The set of ring electrodes is positioned around the ring support section and is electrically isolated (e.g., by a composite layer) from the mandrel and from adjacent tool sections of a logging string or logging while drilling (LWD) assembly.

At least some tool embodiments employ multiple such resistivity logging tool modules coupled directly or indirectly (e.g., via intermediate logging tools of other types) to form a multi-module resistivity logging tool. The modules may include adapters to facilitate such coupling, and in at least some embodiments, such adapters provide electrical isolation at the joints between adjacent modules. Such isolation joint adapters may employ a pair of rubber washers and an insulating layer between the mandrel and the adapter. Additional protection of the overlapping regions of the mandrel and adapter is achievable with a composite layer and an outer wrapping as described below. Although not required, the set of ring electrodes for different modules may be different.

The disclosed tool and method embodiments are best understood in context. Accordingly, FIG. 1 shows an illustrative LWD environment. A drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus 9 around drill string 8, and into a retention pit 24. The drilling fluid transports cuttings from the borehole 16 into the pit 24 and aids in maintaining the integrity of the borehole. Depending on the job requirements, the drilling fluid may be oil-based (with a high resistivity) or water-based (with a low resistivity).

The drill bit 14 is just one piece of an open-hole LWD assembly that includes one or more drill collars 26 and logging instruments 28, 31. Drill collars 26 are thick-walled steel pipe sections that provide weight and rigidity for the drilling process. The logging instruments 28, 31 (some of which may be built in to the drill collars) gather measurements of various drilling parameters such as position, orientation, weight-on-bit, borehole diameter, etc. As an example, logging instrument 28 may be integrated into the bottom-hole assembly near the bit 14 to collect pulsed neutron tool density measurements, acoustic wave propagation measurements, or gamma ray intensity measurements. Logging instrument 31 may be a multi-module electrode-based resistivity logging tool having multiple resistivity logging tool modules 32 with adapters 33 that couple the modules together and integrate the logging instrument into the drill string 8.

Measurements from the logging instruments 28, 31 can be acquired by a telemetry sub (e.g., built in to logging instrument 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used.

At various times during the drilling process, the drill string 8 may be removed from the borehole 16 as shown in FIG. 2. Once the drill string 8 has been removed, logging operations can be conducted using a wireline logging sonde 34, i.e., an assembly of wireline logging instruments suspended by a cable 42 having conductors for transporting power to the tool and telemetry from the tool to the surface. It should be noted that various types of formation property sensors can be included with the wireline logging sonde 34. Without limitation, the illustrative wireline logging sonde 34 includes a multi-module electrode-based resistivity logging tool having multiple resistivity logging tool modules 32 with adapters 33 as discussed further below.

A wireline logging facility 44 collects measurements from the logging tool 34, and includes computing facilities 45 for managing logging operations, acquiring and storing the measurements gathered by the wireline logging sonde 34, and optionally processing the measurements for display to a user. For the logging environments of FIGS. 1 and 2, measured parameters can be recorded and displayed in the form of a log, i.e., a two-dimensional graph showing the measured parameter as a function of tool position or depth.

FIG. 3 shows an illustrative computer system 43 for managing logging operations. The computer system 43 may correspond to, e.g., an onsite logging facility for the drilling rig of FIG. 1, the computing facilities 45 of the wireline logging facility 44 of FIG. 2, or a remote computing system that receives logging measurements from such logging facilities. The computer system 43 may include wired or wireless communication interfaces receiving such logging measurements. As shown, the illustrative computer system 43 comprises user workstation 51 with a computer chassis 46 coupled to a display device 48 and a user input device 50. The computer chassis 46 includes one or more information storage devices for accessing software (shown in FIG. 3 in the form of removable, non-transitory information storage media 52) that configures the computer system to interact with a user, enabling the user to process the logging data and, in the case of local logging facilities, to manage logging operations including analyzing borehole conditions, detecting logging defects or conflicts, and dynamically adjusting logging operations based on resistivity tool module options. The software may also be downloadable software accessed through a network (e.g., via the Internet).

In some embodiments, illustrative computer system 43 executes software that assists a user in the design and configuration of a multi-module electrode based resistivity logging tool, including determination of relative electrode positions, inter-module distances, mapping of transmitter and receiver roles to the electrodes, timing of transmitter operations, transmit signal frequencies, and adaptation planning to accommodate changing downhole conditions. As an example, the computer system 43 may generate a preliminary resistivity logging plan with a multi-module resistivity tool map that identifies the locations of receiver electrodes and transmitter electrodes for multiple modules that are able to operate together. If conflicts or defects in the transmitter or receiver operations are detected, an updated resistivity logging plan may be selected by an operator or may be selected automatically based on predetermined control criteria.

At least some of the disclosed electrode-based resistivity logging tool designs employ configurable resistivity logging tool modules to maximize flexibility. A disassembled version of an illustrative resistivity logging tool module 32 is shown (in cross-section) in FIG. 4A.

Figure 4A:
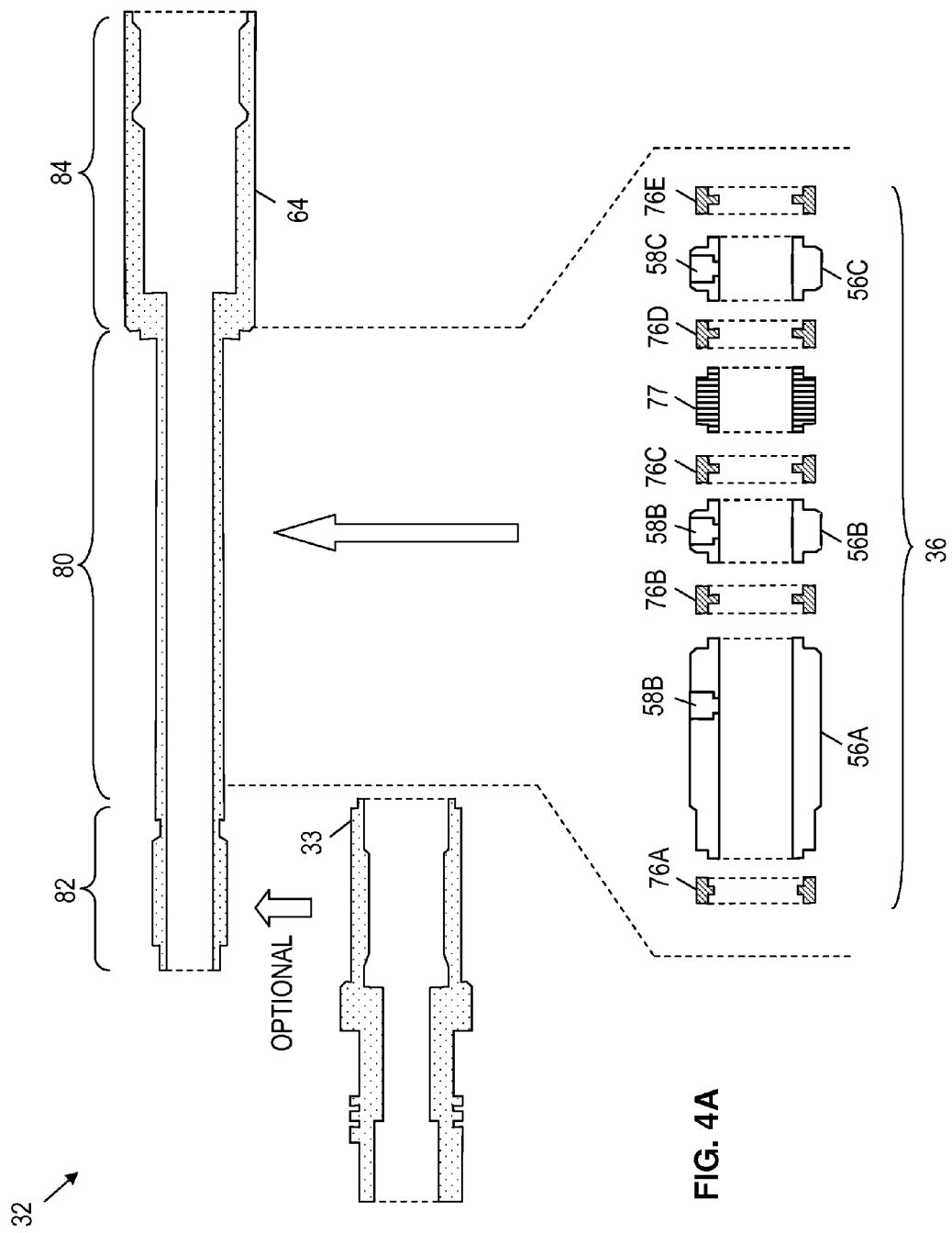
FIG. 4A shows a cross-section of various parts of a disassembled resistivity logging tool module.

The resistivity logging tool module 32 shown in FIG. 4A includes a mandrel 64 with connector sections 82 and 84 at opposite ends, and a ring support section 80 disposed between the connector sections 82 and 84. The connector section 82 may correspond to a male connector section, and the connector section 84 may correspond to a female connector section. The resistivity logging tool module 32 may include an optional adapter 33 to be coupled to connector section 82 during assembly. In some resistivity logging tool module embodiments, the adapter 33 is omitted. For example, adjacent resistivity logging tool modules 32 may be fitted together directly without adapters 33, an arrangement that may be preferred in some cases if it is not necessary to provide electrical isolation between adjacent modules. The decision to omit adapter 33 may be based on string dimension criteria, electrode spacing criteria, logging conflict criteria, availability of adapters, the compatibility of module connectivity elements (e.g., threads) with the connectivity elements of other string sections, etc.

The resistivity logging tool module 32 shown in FIG. 4A also includes a set of ring components 36 to be positioned around the ring support section 80 during assembly. The illustrated set of ring components 36 includes resistivity logging tool electrode rings 56A-56C with corresponding electrode pins 58A-58C. It is contemplated, though not required, that electrode ring 56A will be a transmitter electrode while electrode rings 56B and 56C will be receiver electrodes. Because transmitter electrodes may be expected to convey greater currents than receiver electrodes, such electrodes are generally (though not necessarily) larger. In the illustrated embodiment, the increased size is achieved by making transmitter electrode ring 56A wider than the receiver electrode rings 56B and 56C.

FIG. 4A further illustrates bonding rubber rings 76A-76E. Bonding rubber rings 76A and 76B are positioned on opposite sides of electrode ring 56A, bonding rubber rings 76B and 76C are on opposite sides of electrode ring 56B, and bonding rubber rings 76D and 76E are on opposite sides of electrode ring 56D. The illustrated set of ring components 36 includes an optional composite ring or spacer 77 between bonding rubber rings 76C and 76D. Some embodiments include a composite spacer 77 between any adjacent bonding rubber rings 76, i.e., bonding rubber rings 76 associated with different electrodes. The composite spacers 77 are sized in accordance with the desired electrode ring spacing.

Figure 4B:
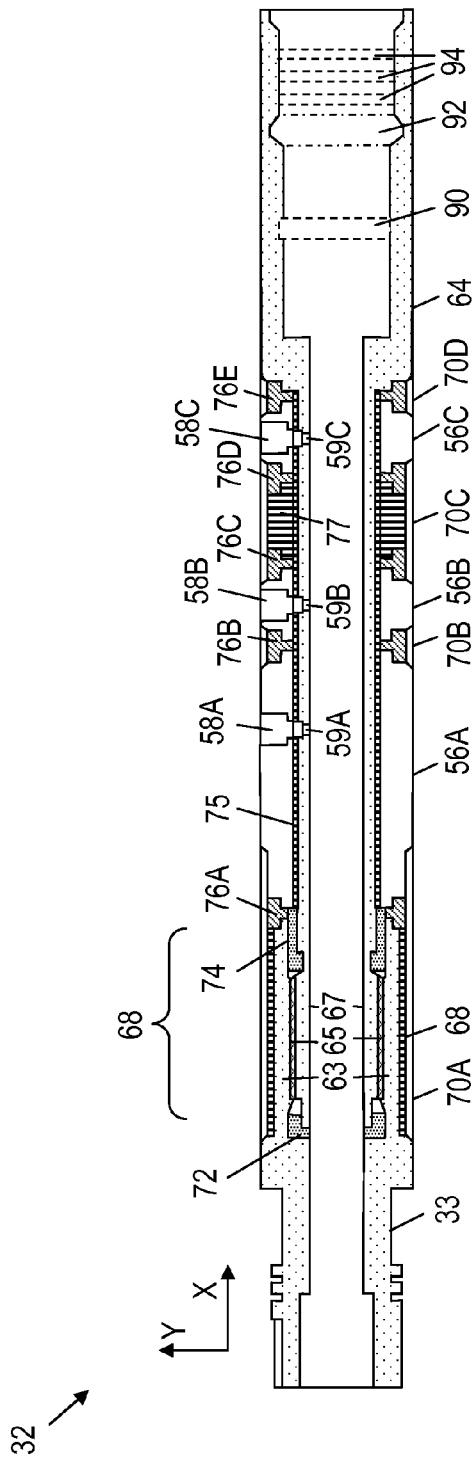
FIG. 4B shows a cross-section of an assembled resistivity logging tool module with optional adapter.
Figure 5:
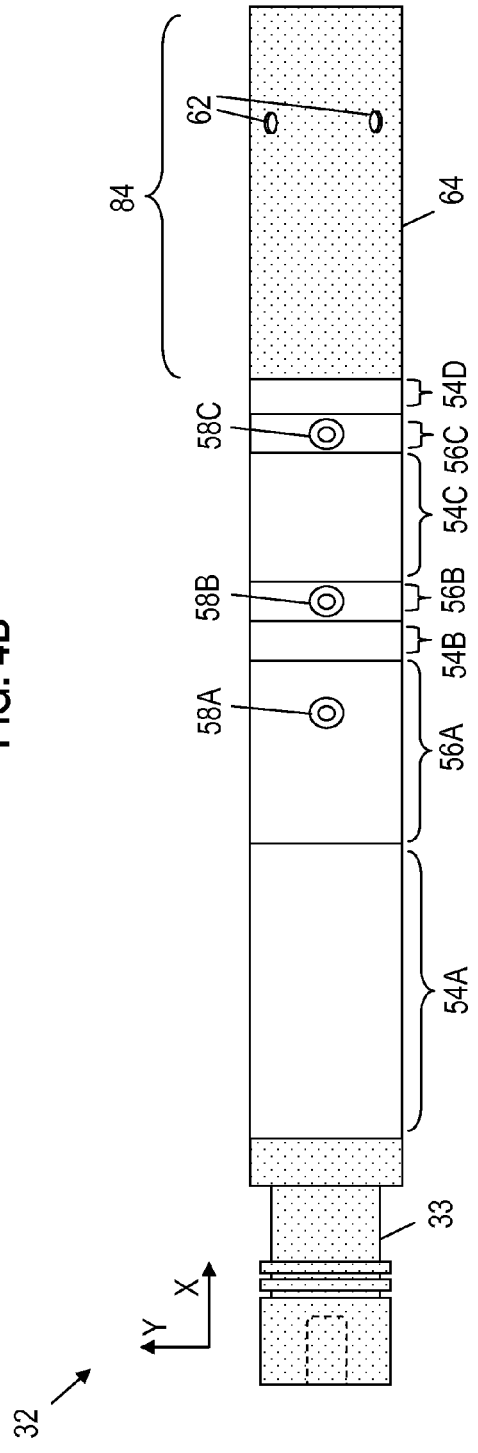
FIG. 5 shows a side view of an assembled resistivity logging tool module with optional adapter.

FIG. 4B shows a cross-section of the illustrative resistivity logging tool module 32 in assembled form, while FIG. 5 shows an external view. FIG. 5 shows that the connector section 84 of mandrel 64 is still visible while the connector section 82 is covered by adapter 33. Ring support section 80 is covered by the set of ring components 36. During assembly, a composite layer 75 of fiberglass or other insulating material is placed around the ring support section 80 before the set of ring components 36 is put into place. In this manner, electrical isolation between the mandrel 64 and the electrode rings 56A-56C is assured. During assembly, the individual rings from the set of ring components 36 may be placed over the smaller diameter connector section 82 and moved into their respective places along the ring support section 80. In alternative embodiments, one or more rings from the set of ring components 36 may be placed over the larger diameter connector section 84 or adapter 33 and moved into place along the ring support section 80 using thermal expansion or shrink wrap assembly techniques.

In some embodiments, the electrode pins 58A-58C may be integrated with and electrically coupled to their respective electrode rings 56A-56C. For example, the electrode pins 58A-58C may be included with electrode rings 56A-56C as a pre-assembled package. In another embodiment, the electrode rings 56A-56C may be machined to include an electrode pin slot before being moved onto the mandrel 64, enabling the electrode pins 58A-58C to be readily put into place afterwards. Alternatively, the electrode pin slots may be machined into electrode rings 56A-56C after the electrode rings 56A-56C have been placed onto the mandrel 64, thus assuring the desired alignment for the electrode pins. Underneath electrode pins 58A-58C, respective mandrel openings 59A-59C may extend to an interior cavity of mandrel 64 to enable power supply and/or sense cables (not shown in FIG. 4B, but represented in FIG. 6) to reach the electrode pins 58A-58C. Such power or sense cables may be connected to electrode pins 58A-58C after they are already in place along mandrel 64. Alternatively, power or sense cables may be pre-connected to electrodes 58A-58C before they are put into corresponding electrode pin slots in electrode rings 56A-56C.

In FIG. 4B, the optional adapter 33 has been mated with connector section 80 of mandrel 64 in an isolation joint configuration that includes a dielectric compound layer 65 between threaded section 63 of adapter 33 and threaded section 67 of mandrel 64. The isolation joint configuration also includes isolation washers 72 and 74. The isolation washers 72 and 74 may be installed during the assembly process to ensure that adapter 33 and mandrel 64 are electrically isolated once assembly is complete. As shown, the isolation washers 72 and 74 separate adapter 33 and mandrel 64 along the X and Y directions shown for FIG. 4B.

Once the isolation joint configuration between adapter 33 and mandrel 64 is complete, the assembly process is finished by adding various external layers. For example, a composite layer 68 may be placed around the outer surface of the threaded section 63 of adapter 33 in the area of the isolation joint configuration. As shown, the composite layer 68 may extend in the X direction between the bonding rubber ring 76A and isolation washer 72. Further, various protective outer layers 70A-70D (e.g., fiberglass) are wrapped around non-conductive surfaces of the module 32. The outer layers 70A-70D provide wear resistance and serve as insulating rings 54A-54D (FIG. 5) to enable fine-tuning the widths and/or spacing between electrode rings 56A-56C. Similarly, the spacing between electrode rings 56A and 56C and the electrode rings of other modules (e.g., in a multi-module resistivity logging tool) may be fine-tuned by adjusting the overlap of outer layers 70A or 70D with the electrode rings.

The cross-section of FIG. 4B also shows various indentations/grooves 90 and 92, and threads 94 along the interior surface of mandrel 64. The indentations/grooves 90 and 92, and threads 94 may be machined before or after assembly of the module 32 to facilitate joining the module 32 to other modules or sections of a LWD string or wireline logging string.

FIG. 5 shows a side view of an assembled resistivity logging tool module 32 with optional adapter 33. As shown, the electrode rings 56A-56A and their respective electrodes 58A-58C are separated from each other by insulating rings 54B and 54C. Further, insulating ring 54A may separate electrode ring 56A from adapter 33 and insulating ring 54D may separate conductive ring 56C from connector section 84 of mandrel 64. In some embodiments, connector section 84 may be machined to include grip elements (e.g., holes or protrusions) 62 that facilitate turning mandrel 64 during assembly or disassembly of a LWD string or wireline logging string. Similar grip elements (not shown) may be provided on adapter 33.

It should be understood that the embodiment of FIGS. 4A, 4B, and 5 is illustrative only. Other embodiments, for example, may have additional or fewer electrode rings. Further, the width of the electrode rings 56A-56C and the insulating rings 54A-54D may vary. Further, the spacing between and/or the position of the electrode rings 56A-56C may vary.

Various dimensions for the illustrative resistivity logging tool module 32 are given herein for descriptive purposes and should not be taken as limiting in any way. The length of illustrative resistivity logging tool module 32 with the optional adapter 33 may be approximately 31.75 units (e.g., inches or feet) along the X axis shown in FIG. 5. More specifically along the X axis, insulating ring 54A may have a length of approximately 8 units, electrode ring 56A may have a length of approximately 5 units, insulating ring 54B may have a length of approximately 1 unit, conductive ring 56B may have a length of approximately 1 unit, insulating ring 54C may have a length of approximately 3.5 units, conductive ring 56C may have a length of approximately 1 unit, insulating ring 54D may have a length of approximately 1 unit, and connector section 84 of mandrel 64 may have a length of approximately 10 units. Further, the center-to-center spacing between electrodes 58A and 58B may be approximately 3 units, while the center-to-center spacing between electrodes 58A and 58C may be approximately 7.5 units. Further, the visible length of adapter 33 in FIG. 5 may be approximately 6.5 units.

Meanwhile, along the Y axis, the inner diameter of the mandrel 64 along connector section 82 may be approximately 1.5 units (e.g., inches), the outer diameter of the washer 72 may be approximately 2.475 units, the outer diameter of the washer 74 may be approximately 2.65 units, the width of the composite layers 68 and 75 may be approximately 0.2 units, the width of the outer layers 70A-70D may be approximately 0.3 units. Further, the bonding rubber rings 76A-76E may have a T-shape with a total length of approximately 0.7 units along the X axis and total width of approximately 0.475 units along the Y axis. Further, the apertures for electrode pins 58A-58C may have a length of approximately 0.75 units along the X axis and a width of approximately 0.55-0.56 units along the Y axis. Smaller apertures having a length of approximately 0.44 units along the X direction and a width of approximately 0.32 units along the Y direction may extend through composite layer 75 and part of the ring support section 80 of mandrel 64 to support electrode pins 58A-58C or electrode cabling. Further, additional apertures having a length of approximately 0.34 units along the X direction may extend from the smaller apertures to an interior of the mandrel 64 to enable electrode pins 58A-58C to be connected to power or sense cabling.

Some modules and module components may vary in size, length, or proportion from the example dimensions given. In addition, the materials used for each module may vary. For example, the mandrel 64 may be constructed from a magnetizable material that serves to shield an interior of the mandrel 64 from external magnetic fields. However, use of magnetizable material may result in an internal magnetic field that affects logging measurements and that needs to be accounted for. Alternatively, a non-magnetizable material will not produce its own magnetic field. However, magnetic fields that penetrate the non-magnetizable material may affect logging measurements and thus may need to be accounted for. The selection of whether a magnetizable mandrel 64 or a non-magnetizable mandrel 64 is used may depend on predicted or known logging operations or conflicts.

Figure 6:
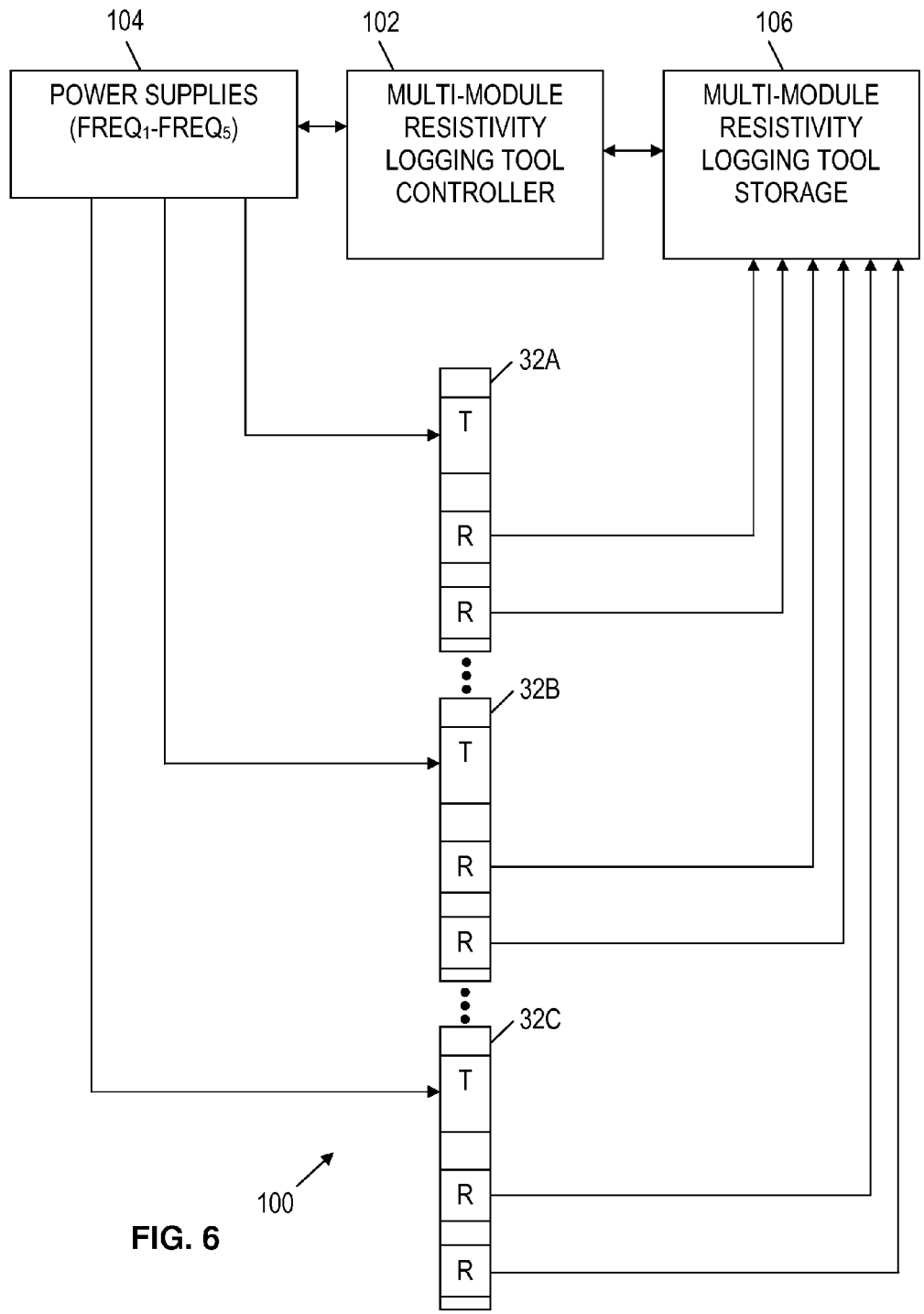
FIG. 6 shows an illustrative multi-module resistivity logging tool for a logging string or LWD assembly.

FIG. 6 provides a block diagram of an illustrative multi-module resistivity logging tool system 100, minus adapters or optional intervening logging instrument sections. As shown, the system 100 comprises a plurality of resistivity logging tool modules 32A-32C. Although other variations are possible, each of the modules 32A-32C is shown to have a transmitter ring electrode (labeled "T" for convenience) and two receivers ring electrodes (labeled "R" for convenience). Though the modules 32A-32C are shown with similar electrode configurations, it is contemplated that different electrode configurations may be employed with different modules. For example, some modules may have reduced-width transmitter and receiver ring electrodes with reduced inter-electrode spacings for use with higher signal frequencies.

The system electronics (multi-module resistivity logging tool controller 102, power supply unit 104, and multi-module resistivity logging tool data acquisition and storage unit 106) may be positioned within one of the modules 32A-32C, or alternatively may be placed in a separate electronics module and coupled to the resistivity logging tool modules 32A-32C via wiring in the form of power cabling and sense cabling. As shown, the transmitter ring electrodes in each of the modules 32A-32C are coupled to the power supply unit 104 via power cabling. The receiver ring electrodes in each of the modules 32A-32C are coupled to the data acquisition and storage unit 106 via sense cabling.

The power supply unit provides to each of the transmit ring electrodes a respective transmit signal that is distinguishable in some fashion from the other transmit signals, e.g., by being transmitted at a different time, being transmitted at a different frequency, and/or being transmitted with a different modulation pattern. It is contemplated that the power level and carrier frequency of each transmit signal will be adjustable, and moreover, that they may be adjusted during the course of the logging run. In at least some embodiments, each transmit signal includes at least two frequency components from a supported set of five different signal frequencies provided by the power supply unit 104, e.g., 50 Hz, 100 Hz, 200 Hz, 300 Hz, and 350 Hz.

In at least some embodiments, the data acquisition and storage unit 106 acquires and stores receive signals representing the receive ring electrode voltage response to the operation of each transmit ring electrode. In at least some embodiments, unit 106 further operates to communicate representative measurements to a logging facility at the surface. Based on a predetermined current emitted by a transmitter and voltage responses detected at different receivers, the formation resistivity can be estimated. With multiple modules 32A-32C, formation resistivity may be determined over various spatial resolutions and various depths of investigation by controlling which transmitter ring electrode emits current and which receiver ring electrode voltages are considered. Although three modules are illustrated in FIG. 6, additional or fewer modules could be employed in a LWD string or wireline logging string.

The controller 102 may monitor the levels of the measured voltage responses and, should these levels be determined to be inadequate, may boost the transmit signal power and/or lower the transmit signal frequency to return the measured voltage responses to acceptable levels. Conversely, if the measured voltage responses are approaching or exceeding a preset limit, the controller 102 may reduce the transmit signal power and/or raise the transmit signal frequency. The controller 102 may further detect operational faults such as, e.g., inconsistent performance of a receiver ring electrode or a nonoperational transmitter ring electrode, and may omit such electrode from further usage. In alternative embodiments, the multi-module resistivity logging tool controller 102 relies on the logging crew to monitor tool performance and to send commands the alter the operation of the tool.

Figure 7:
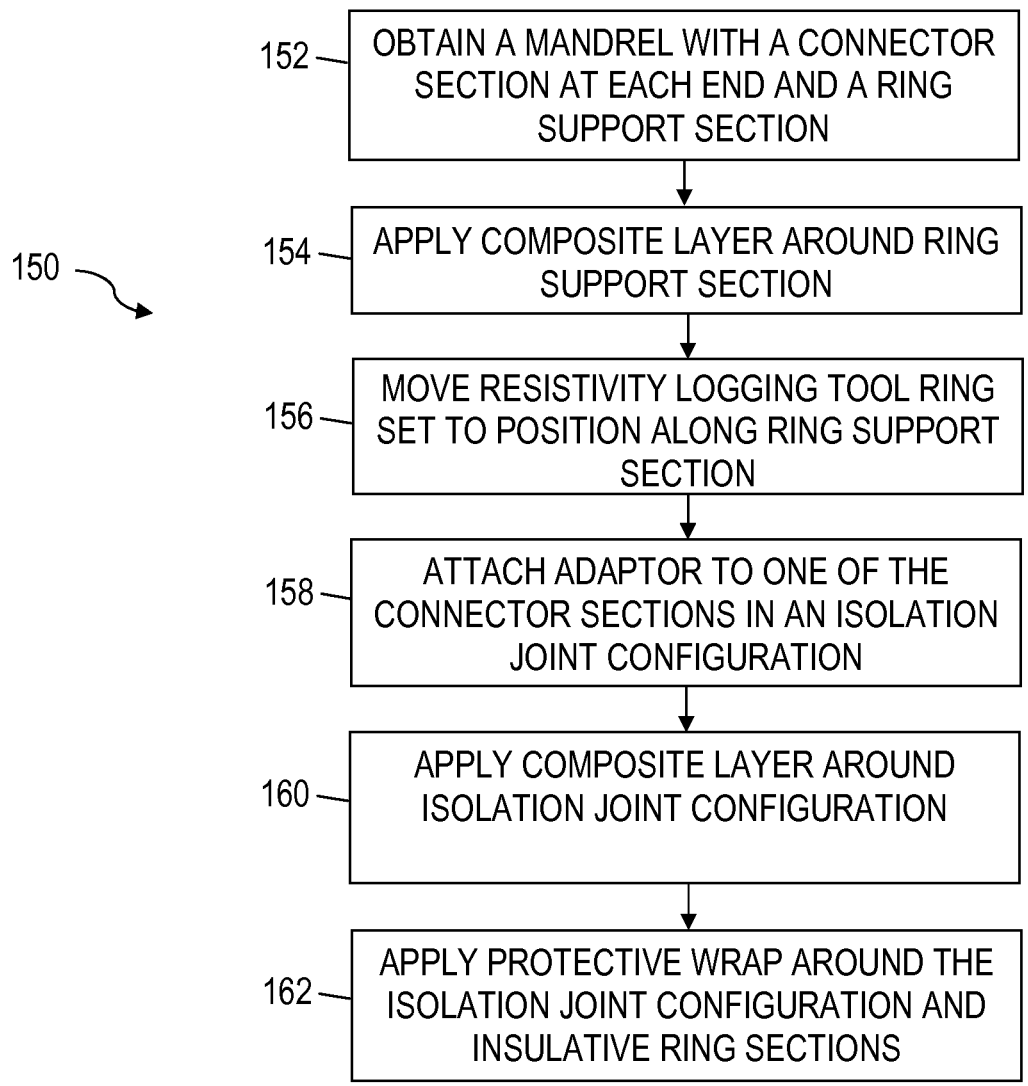
FIG. 7 shows a flowchart of an illustrative resistivity logging tool module assembly method.

FIG. 7 shows a flowchart of an illustrative resistivity logging tool module assembly method 150. As shown, the method 150 includes obtaining a mandrel with a connector section at each end and a ring support section disposed between the connectors at block 152. Although not required, the connector sections may correspond to a male connector section at one end and a female connector section at the other end, where the male connector section has approximately the same outer diameter as the ring support section and has a smaller outer diameter than the female connector section. A composite layer is applied around the ring support section at block 154, and then a set of ring components is moved into position along the ring support section at block 156. The composite layer disposed at block 152 electrically isolates the mandrel from the ring electrodes included in the set of ring components.

At block 158, an adapter is attached to one of the connector sections of the mandrel in an isolation joint configuration. The isolation joint configuration may include washers and a dielectric layer as described previously. At block 160, a composite layer is applied around the isolation joint adapter. Finally, a protective outer layer is applied around the isolation joint adapter and over the inter-electrode portions of the set of ring components, thereby forming the previously described insulating rings. The protective outer layer is insulating and thus can be used to fine-tune the spacing between the ring electrodes. In some embodiments, the protective outer layer is a fiberglass or carbon fiber wrap. Further, illustrative materials for the composite layer of steps 154 and 158 include fiberglass, ceramic, or thermoplastic.

Figure 8:
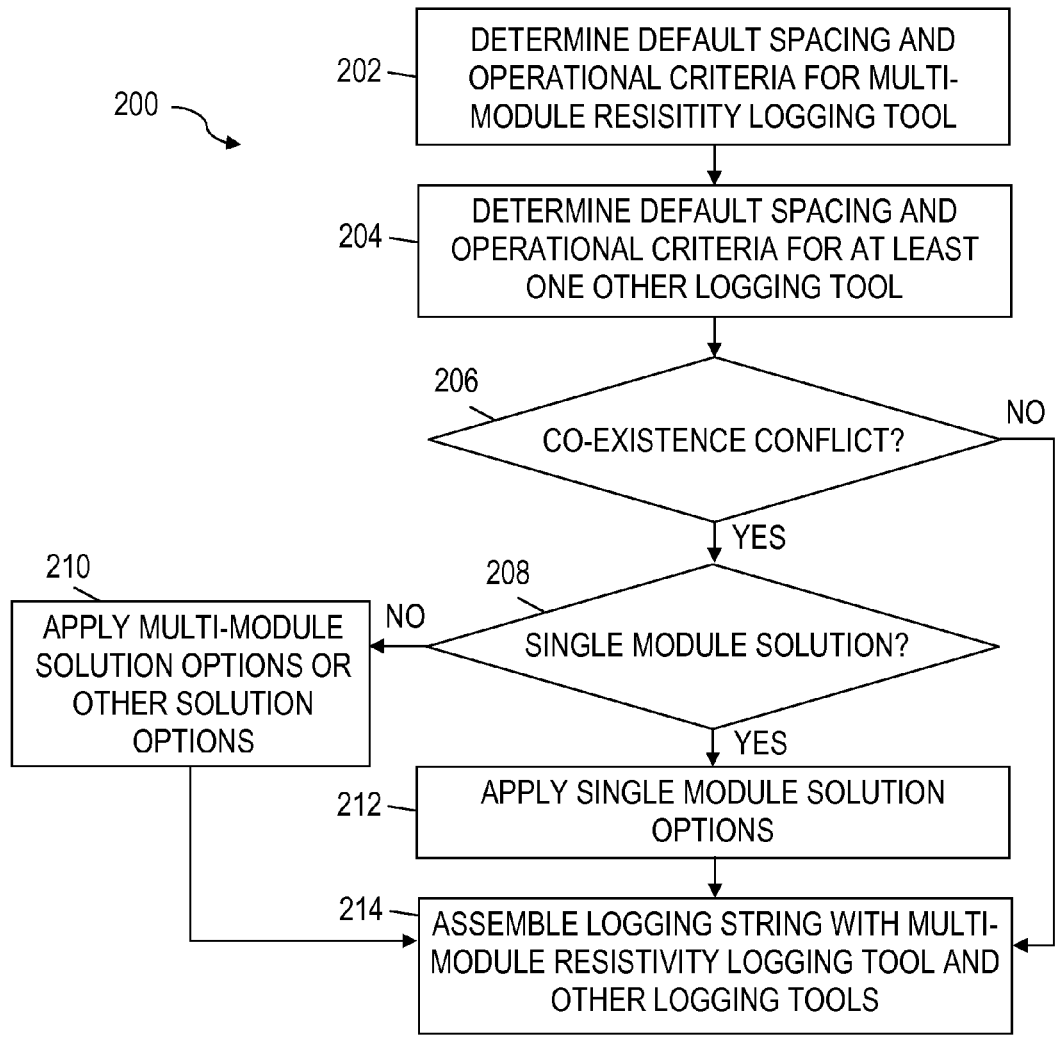
FIG. 8 shows a flowchart of an illustrative logging string assembly method.

FIG. 8 shows a flowchart of an illustrative multi-module resistivity logging tool string assembly method 200. The method 200 may be performed by the logging crew to verify the logging tool string design before assembly. As shown, the method 200 comprises determining a default spacing and operational criteria for a multi-module resistivity logging tool (block 202). Such default spacing and operational criteria may be specified by tool designers in the operating manual for the tool to provide for optimal operation across the widest feasible range of downhole environments. At block 204, default spacing and operational criteria is determined for at least one other desired logging tool. Illustrative examples include acoustic logging tools, nuclear magnetic resonance logging tools, electromagnetic telemetry tools, and survey modules. Such tools can potentially experience interference from the currents injected by the multi-module resistivity logging tool or may impose spacing or sizing requirements that are incompatible with the default spacing and operational criteria for the multi-module resistivity logging tool.

The possible tool string configurations are examined and, if there is a co-existence conflict (block 206), a determination is made regarding whether a single resistivity logging tool module solution is possible (block 208), e.g., whether the client can obtain the desired resistivity logs with a single module resistivity logging tool. Such single module solution options may involve adjusting the number of transmitter or receiver ring electrodes of a single module, adjusting the spacing between the ring electrodes, adjusting the ring electrode widths and/or spacings, adjusting the module materials (magnetizable to non-magnetizable or vice versa), and/or adjusting logging operations (power level, frequency, and/or timing). If an acceptable single module solution is possible (block 208), then the selected resistivity logging tool module is combined with the other logging tools in block 214.

If a single module solution is determined to be infeasible in block 208, then an alternative, possibly suboptimal, multi-module resistivity logging tool solution is devised in block 210 to honor the spacing and operational criteria of the other logging tools. Such single module solution options may involve adding, omitting, and rearranging the individual modules, adjusting the number of transmitter or receiver ring electrodes of individual modules, adjusting the spacing between the ring electrodes, adjusting the ring electrode widths and/or spacings, adjusting the module materials (magnetizable to non-magnetizable or vice versa), and/or adjusting logging operations (power level, frequency, and/or timing). This solution is then employed in the assembly process of block 214. If no co-existence conflict is identified in block 206, then the default solution can be employed in block 214.

Figure 9:
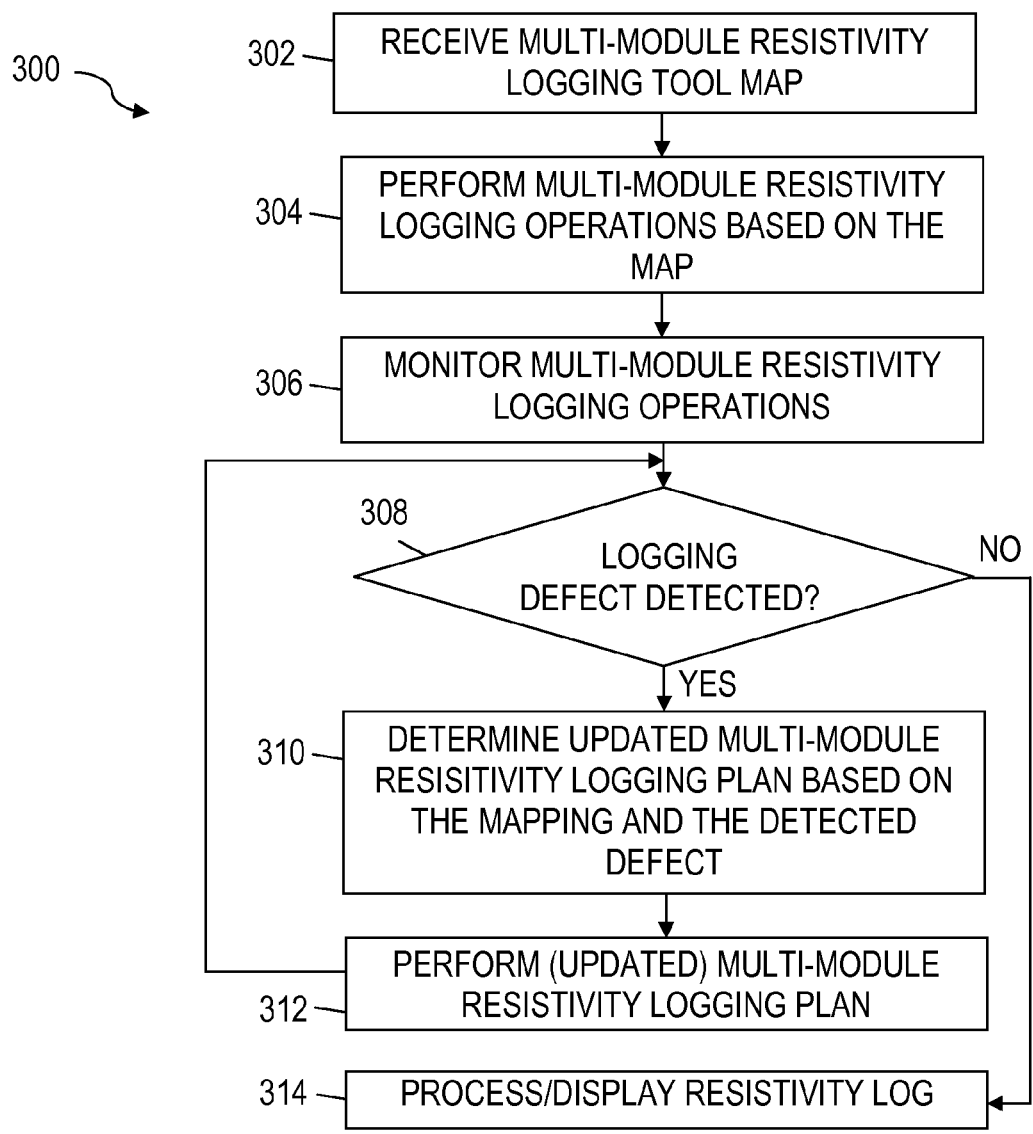
FIG. 9 shows a flowchart of an illustrative multi-module resistivity logging tool control method.

FIG. 9 shows a flowchart of an illustrative multi-module resistivity logging tool control method 300. The method 300 may be performed, for example, by a logging facility computer system or resistivity logging tool controller that manages logging operations with or without involvement of a logging operator. As shown, the method 300 comprises receiving a multi-module resistivity tool map at block 302. The map, for example, may include the positions of transmitter and receiver ring electrodes associated with multiple modules along a logging string. The map also may include the available operational frequency options and power level options for each transmitter ring electrode. At block 304, multi-module resistivity logging operations are performed based on the map, e.g., by employing each transmitter ring electrode in sequence and monitoring the resulting voltage responses for each receiver ring electrode. In block 306, multi-module resistivity logging operations are monitored for consistency with expected operations. If a resistivity logging defect is detected (block 308), an updated multi-module resistivity logging plan is determined based on the map and the detected defect (block 310). For example, the updated resistivity logging plan may adjust the power levels and/or frequencies for one or more transmitters of the multi-module resistivity logging tool. Further, the updated resistivity logging plan may gather voltage sense data from a different set of receivers of the multi-module resistivity logging tool.

At block 312, the controller performs a multi-module resistivity logging plan, which if no logging defect was detected, is the current plan, but which otherwise is the updated logging plan. In block 314 the collected resistivity log is further processed and/or displayed, and blocks 306-314 are repeated until logging is complete.

The various logging management methods described herein can be implemented in the form of software that can be communicated to a computer or another processing system on an information storage medium such as an optical disk, a magnetic disk, a flash memory, or other persistent storage device. Alternatively, such software may be communicated to the computer or processing system via a network or other information transport medium. The software may be provided in various forms, including interpretable "source code" form and executable "compiled" form. The various operations carried out by the software as described herein may be written as individual functional modules (e.g., "objects", functions, or subroutines) within the source code.

Numerous variations and modifications will become apparent to those skilled in the art once the above disclosure is fully appreciated. For example, though the methods disclosed herein have been shown and described in a sequential fashion, at least some of the various illustrated operations may occur concurrently or in a different sequence, with possible repetition. It is intended that the following claims be interpreted to embrace all such variations, equivalents, and modifications.

What is claimed is:

1. A resistivity logging tool module, comprising:
   a mandrel with connector sections at each end and a ring support section between the connector sections;
   a composite layer disposed around the ring support section;
   a set of ring electrodes disposed along the ring support section around the composite layer, wherein the composite layer electrically isolates the set of ring electrodes from the ring support section and wherein at least one of the ring electrodes includes an electrode pin slot aligned with an aperture that extends to an interior of the mandrel; and
   an adapter in an isolation joint configuration with one of the connector sections.

2. The resistivity logging tool module of claim 1, wherein the mandrel comprises a male connector section at one end and a female connector section at the other end, and wherein an outer diameter of the ring support section and the male connector section is smaller than an outer diameter of the female connector section.

3. The resistivity logging tool module of claim 1, wherein the set of ring electrodes comprises at least one electrode transmitter ring and at least two electrode receiver rings.

4. The resistivity logging tool module of claim 3, wherein the electrode transmitter ring is wider than the electrode receiver rings.

5. The resistivity logging tool module of claim 1, wherein the set of ring electrodes comprises a plurality of electrode rings and wherein a plurality of bonding rubber rings separate the plurality of electrode rings from each other.

6. The resistivity logging tool module of claim 5, further comprising a composite ring positioned between two of the bonding rubber rings.

7. The resistivity logging tool module of claim 1, further comprising a plurality of outer layer wraps to provide insulating sections between electrodes of the set of ring electrodes.

8. The resistivity logging tool module of claim 1, wherein the isolation joint configuration comprises:
 a dielectric layer between threads of the adapter and threads of a selected one of the connector sections;
 a first washer to separate an end of the selected connector section from the adapter; and
 a second washer to separate an end of the adapter from the selected connector section.

9. The resistivity logging tool module of claim 8, further comprising a composite layer and a fiberglass wrap disposed around the isolation joint configuration.

10. A logging string, comprising:
 a multi-module resistivity logging tool having a plurality of modules, each of the modules having:
  a mandrel with a connector section at each end and a ring support section between the connector sections;
  a set of ring electrodes disposed around its ring support section, wherein at least one of the ring electrodes includes an electrode pin slot aligned with an aperture that extends to an interior of the mandrel; and
  a composite layer disposed around its ring support section, wherein the composite layer electrically isolates its set of ring electrodes from its mandrel,
  wherein one of the modules of the multi-module resistivity logging tool includes an adaptor in an isolation joint configuration with one of its connector sections.

11. The logging string of claim 10, wherein two of the modules of the multi-module resistivity logging tool are directly coupled to each other without an adaptor.

12. The logging string of claim 10, wherein the adaptor couples its corresponding module to another module of the multi-module resistivity logging tool.

13. The logging string of claim 10, wherein the adaptor couples its corresponding module to a logging string section that is not part of the multi-module resistivity logging tool.

14. The logging string of claim 11, wherein two modules of the multi-module resistivity logging tool are separated from each other by a logging string section that is not part of the multi-module resistivity logging tool.

15. The logging string of claim 11, wherein the different modules of the multi-module resistivity logging tool are configured to perform resistivity logging operations at different frequencies.

16. The logging string of claim 11, wherein resistivity logging operations for the logging string are dynamically configurable based on a map for the multi-module resistivity logging tool.

17. A resistivity logging tool module assembly method, comprising:
 obtaining a mandrel with connector sections at each end and a ring support section between the connector sections;
 disposing a composite layer around the ring support section; and
 moving a set of ring electrodes to a position along the ring support section, wherein the composite layer electrically isolates the set of ring electrodes from the ring support section and wherein at least one of the ring electrodes includes an electrode pin slot aligned with an aperture that extends to an interior of the mandrel,
 wherein one of the modules of the multi-module resistivity logging tool includes an adaptor in an isolation joint configuration with one of its connector sections.

18. The method of claim 17, further comprising attaching an adapter to one of the connector sections in an isolation joint configuration and disposing a composite layer around the isolation joint configuration after said attaching.

19. The method of claim 18, further comprising applying a protective wrap around the isolation joint configuration and around insulating ring sections between electrodes of the set of ring electrodes.

20. The method of claim 17, wherein moving the set of ring electrodes to a position along the ring support section comprises moving two electrode rings and a spacer ring between the two electrode rings, wherein the spacer ring comprises a composite ring that is positioned between two bonding rubber rings.

* * * * *